US009088025B2

(12) United States Patent
Lee et al.

(10) Patent No.: US 9,088,025 B2
(45) Date of Patent: *Jul. 21, 2015

(54) POUCH-TYPED SECONDARY BATTERY WITH IMPROVED SAFETY AND EXCELLENT MANUFACTURING PROCESS PROPERTY

(71) Applicant: LG Chem, Ltd., Seoul (KR)

(72) Inventors: Wooyong Lee, Chungcheongbuk-do (KR); Byungjin Choi, Daejeon (KR); Hyang Mok Lee, Daejeon (KR); Chang Bum Ahn, Chungcheongbuk-do (KR); Jun Hwan Jang, Seoul (KR)

(73) Assignee: LG Chem, Ltd. (KR)

( * ) Notice: Subject to any disclaimer, the term of this patent is extended or adjusted under 35 U.S.C. 154(b) by 100 days.

This patent is subject to a terminal disclaimer.

(21) Appl. No.: 13/741,509

(22) Filed: Jan. 15, 2013

(65) Prior Publication Data

US 2013/0130098 A1 May 23, 2013

Related U.S. Application Data

(63) Continuation of application No. 12/310,342, filed as application No. PCT/KR2007/003954 on Aug. 20, 2007, now Pat. No. 8,415,050.

(30) Foreign Application Priority Data

Aug. 21, 2006 (KR) .................. 10-2006-0078500

(51) Int. Cl.
| | |
|---|---|
| H01M 2/04 | (2006.01) |
| H01M 2/06 | (2006.01) |
| H01M 2/02 | (2006.01) |
| H01M 2/22 | (2006.01) |
| H01M 2/26 | (2006.01) |
| H01M 10/04 | (2006.01) |
| H01M 10/052 | (2010.01) |
| H01M 10/0585 | (2010.01) |
| H01M 10/0525 | (2010.01) |
| H01M 10/0565 | (2010.01) |

(52) U.S. Cl.
CPC .............. *H01M 2/06* (2013.01); *H01M 2/021* (2013.01); *H01M 2/0207* (2013.01);
(Continued)

(58) Field of Classification Search
CPC ..... H01M 2/02; H01M 2/0207; H01M 2/217; H01M 2/021
USPC .................... 429/162, 176, 181, 186
See application file for complete search history.

(56) References Cited

U.S. PATENT DOCUMENTS

| 6,110,618 A | 8/2000 | Vacheron et al. |
| 6,242,130 B1 | 6/2001 | Noh et al. |

(Continued)

FOREIGN PATENT DOCUMENTS

| JP | 01-281665 | 11/1989 |
| JP | 2000-200584 A | 7/2000 |

(Continued)

OTHER PUBLICATIONS

International Search Report issued on Nov. 26, 2007 in connection with corresponding International Appln. No. PCT/KR2007/003954.

*Primary Examiner* — Zachary Best
(74) *Attorney, Agent, or Firm* — Lerner, David, Littenberg, Krumholz & Mentlik, LLP

(57) ABSTRACT

Disclosed herein is a secondary battery including an electrode assembly, having pluralities of electrode tabs joined to electrode leads, mounted in a receiving part of a battery case, wherein the battery case has concave steps formed at the inner upper end of the receiving part thereof between electrode tab-electrode lead coupling portions (a cathode terminal portion and an anode terminal portion) of the electrode assembly and at the inner opposite sides of the receiving part thereof corresponding to the opposite sides of the electrode assembly such that the electrode assembly is in tight contact with the concave steps.

16 Claims, 7 Drawing Sheets

(52) U.S. Cl.
CPC ......... *H01M 2/0217* (2013.01); *H01M 2/0277* (2013.01); *H01M 2/0285* (2013.01); *H01M 2/22* (2013.01); *H01M 2/266* (2013.01); *H01M 10/0436* (2013.01); *H01M 10/052* (2013.01); *H01M 10/0585* (2013.01); *H01M 2/0275* (2013.01); *H01M 2/0287* (2013.01); *H01M 10/0525* (2013.01); *H01M 10/0565* (2013.01); *Y02E 60/122* (2013.01)

(56) References Cited

U.S. PATENT DOCUMENTS

| | | | |
|---|---|---|---|
| 6,673,488 | B2 | 1/2004 | Furusaki |
| 8,088,505 | B2 * | 1/2012 | Otohata et al. ............... 429/162 |
| 8,415,050 | B2 * | 4/2013 | Lee et al. .................... 429/176 |
| 2003/0049527 | A1 * | 3/2003 | Yageta et al. ................ 429/179 |
| 2003/0064284 | A1 | 4/2003 | Yoshida et al. |
| 2004/0115527 | A1 | 6/2004 | Hiratsuka et al. |
| 2006/0051658 | A1 * | 3/2006 | Otohata et al. ................ 429/53 |
| 2011/0064991 | A1 | 3/2011 | Ahn |
| 2011/0159328 | A1 | 6/2011 | Yeo |

FOREIGN PATENT DOCUMENTS

| | | | |
|---|---|---|---|
| JP | 2000200584 | A * | 7/2000 |
| JP | 2002-216851 | A | 8/2002 |
| JP | 2003-077426 | A | 3/2003 |
| JP | 2004-281199 | A | 10/2004 |
| KR | 2001-0082058 | A | 8/2001 |
| KR | 2001-0082059 | A | 8/2001 |
| KR | 2001-0082060 | A | 8/2001 |
| KR | 1020020012397 | A | 2/2002 |
| WO | 00/59063 | A1 | 10/2000 |

\* cited by examiner

PRIOR ART (Before experiments) (After experiments)

(Before experiments) (After experiments)

POUCH-TYPED SECONDARY BATTERY WITH IMPROVED SAFETY AND EXCELLENT MANUFACTURING PROCESS PROPERTY

CROSS REFERENCE TO RELATED APPLICATIONS

The present application is a continuation application of U.S. application Ser. No. 12/310,342, filed Sep. 1, 2009, which is a national phase entry under 35 U.S.C. §371 of International Application No. PCT/KR2007/003954, filed Aug. 20, 2007, published in English, which claims the benefit of Korean Patent Application No. 10-2006-0078500, filed Aug. 21, 2006, all of which are incorporated herein by reference.

FIELD OF THE INVENTION

The present invention relates to a secondary battery with improved safety and excellent manufacturing processability, and, more particularly, to a secondary battery including an electrode assembly, having pluralities of electrode tabs joined to electrode leads, mounted in a receiving part of a battery case, wherein the battery case has concave steps formed at the inner upper end of the receiving part thereof between electrode tab-electrode lead coupling portions (a cathode terminal portion and an anode terminal portion) of the electrode assembly and at the inner opposite sides of the receiving part thereof corresponding to the opposite sides of the electrode assembly such that the electrode assembly is in tight contact with the concave steps.

BACKGROUND OF THE INVENTION

As mobile devices have been increasingly developed, and the demand for such mobile devices has increased, the demand for batteries has also sharply increased as an energy source for the mobile devices. Accordingly, much research on batteries satisfying various needs has been carried out.

In terms of the shape of batteries, the demand for prismatic secondary batteries or pouch-shaped secondary batteries, which are thin enough to be applied to products, such as mobile phones, is very high. In terms of the material for batteries, the demand for lithium secondary batteries, such as lithium ion batteries and lithium ion polymer batteries, having a high energy density, a high discharge voltage, and a high output stability, is very high.

Furthermore, secondary batteries may be classified based on the construction of an electrode assembly having a cathode/separator/anode structure. For example, the electrode assembly may be constructed in a jelly-roll (winding) type structure in which long-sheet type cathodes and anodes are wound while separators are disposed respectively between the cathodes and the anodes, a stacking type structure in which pluralities of cathodes and anodes having a predetermined size are sequentially stacked while separators are disposed respectively between the cathodes and the anodes, or a stacking/folding type structure in which pluralities of cathodes and anodes having a predetermined size are sequentially stacked while separators are disposed respectively between the cathodes and the anodes to constitute a bi-cell or a full-cell, and then the bi-cell or the full-cell is wound.

Recently, much interest has been taken in a pouch-shaped battery constructed in a structure in which such a stacking or stacking/folding type electrode assembly is mounted in a pouch-shaped battery case made of an aluminum laminate sheet because of low manufacturing costs, light weight, and easy modification in shape. As a result, the use of the pouch-shaped battery has gradually increased.

FIG. 1 is an exploded perspective view typically illustrating the general structure of a conventional representative pouch-shaped secondary battery.

Referring to FIG. 1, the pouch-shaped secondary battery 10 includes an electrode assembly 30, pluralities of electrode tabs 40 and 50 extending from the electrode assembly 30, electrode leads 60 and 70 welded to the electrode tabs 40 and 50, respectively, and a battery case 20 for receiving the electrode assembly 30.

The electrode assembly 30 is a power generating element comprising cathodes and anodes sequentially stacked while separators are disposed respectively between the cathodes and the anodes. The electrode assembly 30 is constructed in a stacking structure or a stacking/folding structure. The electrode tabs 40 and 50 extend from corresponding electrode plates of the electrode assembly 30. The electrode leads 60 and 70 are electrically connected to the electrode tabs 40 and 50 extending from the corresponding electrode plates of the electrode assembly 30, respectively, for example, by welding. The electrode leads 60 and 70 are partially exposed to the outside of the battery case 20. To the upper and lower surfaces of the electrode leads 60 and 70 are partially attached insulative films 80 for improving sealability between the battery case 20 and the electrode leads 60 and 70 and, at the same time, for securing electrical insulation between the battery case 20 and the electrode leads 60 and 70.

The battery case 20 is made of an aluminum laminate sheet. The battery case 20 has a space, i.e., a receiving part, defined therein for receiving the electrode assembly 30. The battery case 20 is formed generally in the shape of a pouch. In the case that the electrode assembly 30 is a stacking type electrode assembly as shown in FIG. 1, the inner upper end of the battery case 20 is spaced apart from the electrode assembly 30 such that the plurality of cathode tabs 40 and the plurality of anode tabs 50 can be coupled to the electrode leads 60 and 70, respectively. Also, the receiving part of the battery case 20, in which the electrode assembly 30 is received, is generally formed by a deep drawing process. As a result, predetermined inclination and curvature are formed at the side of the receiving part, and therefore, a predetermined space is defined between the outer surface of the electrode assembly 30 and the side of the receiving part. The space is gradually increased by the movement of the electrode assembly in the receiving part of the battery case 20 due to external impact applied to the battery case 20, and the electrode tabs 40 and 50 and the electrode leads 60 and 70 are deviated from their original positions due to the movement of the electrode assembly 30.

FIG. 2 is an enlarged view, in section, illustrating the inner upper end of the battery case of the secondary battery shown in FIG. 1, in which the cathode tabs are coupled to each other in a concentrated state and connected to the cathode lead, and FIG. 3 is a front see-through view illustrating the secondary battery of FIG. 1 in an assembled state.

Referring to these drawings, the plurality of cathode tabs 40, which extend from cathode collectors 41 of the electrode assembly 30, are connected to one end of the cathode lead 60, for example, in the form of a welded bunch constituted by integrally combining the cathode tabs 40 with each other by welding. The cathode lead 60 is sealed by the battery case 20 while the other end 61 of the cathode lead 60 is exposed to the outside of the battery case 20. Since the plurality of cathode tabs 40 are integrally combined with each other to constitute the welded bunch, the inner upper end of the battery case 20 is spaced a predetermined distance from the upper end surface of the electrode assembly 30, and the cathode tabs 40 combined in the form of the welded bunch are bent approximately in the shape of V. Accordingly, the coupling regions between the electrode tabs and the corresponding electrode leads may be referred to as "V-form regions."

However, such V-form regions have a problem in the aspect of safety of the battery. Specifically, when the battery drops with the upper end of the battery, i.e., the cathode lead 60 of the battery, down, or an external physical force is applied to the upper end of the battery, the electrode assembly 30 moves toward the inner upper end of the battery case 20, or the upper end of the battery case 20 is crushed. As a result, the anode of the electrode assembly 30 is brought into contact with the cathode tabs 42 or the cathode lead 60, and therefore, short circuits may occur inside the battery. Consequently, the safety of the battery is greatly lowered.

In this connection, Japanese Patent Application Publication No. 2000-200584 discloses a technology for forming pluralities of grooves and flat parts along the side of a receiving part of a battery case, constructed in a trapezoidal shape when viewing the vertical section of the battery case, to restrain the movement of a jelly-roll type electrode assembly, having a semicircular section, in the receiving part of the battery case. However, the disclosed technology has a drawback in that the plurality of grooves, having relatively small height, must be formed at the side of the receiving part of the battery case, and therefore, it is difficult to form the grooves. Also, the installation of the electrode assembly in the receiving part is difficult due to the grooves formed at the side of the receiving part along the region adjacent to the opening, and, the grooves may be deformed during the installation of the electrode assembly in the receiving part.

Furthermore, the inventors of the present invention have found that, in the above-described structure, the electrode tabs are in partial contact with the grooves at the upper end of the receiving part, having V-form regions for the coupling between the electrode tabs and the electrode leads, and therefore, the electrode tabs are damaged. Also, when a stacking or stacking/folding type electrode assembly, having a rectangular section, is mounted in the battery case constructed as described above, the grooves are further deformed, when an external impact is applied to the secondary battery, whereby the reliability of the secondary battery is lowered.

Consequently, there is a high necessity for a technology that is capable of easily deforming the receiving part of the battery case, easily mounting the electrode assembly in the receiving part of the battery case, and preventing the occurrence of a short circuit of the secondary battery due to the movement of the electrode assembly.

SUMMARY OF THE INVENTION

Therefore, the present invention has been made to solve the above problems, and other technical problems that have yet to be resolved.

As a result of a variety of extensive and intensive studies and experiments to solve the problems as described above, the inventors of the present invention have found that, when a receiving part of a battery case, corresponding to electrode tab-electrode lead coupling portions (V-form regions) and opposite sides of an electrode assembly, mounted in a secondary battery, is deformed into a predetermined shape, such that the electrode assembly is brought into tight contact with corresponding regions of the battery case, the movement of the electrode assembly due to external impact to the secondary battery, such as dropping of the secondary battery, is restrained, thereby preventing the occurrence of a short circuit in the secondary battery, and the deformation of the receiving part of the battery case and the installation of the electrode assembly in the receiving part of the battery case are easily accomplished. The present invention has been completed based on these findings.

In accordance with one aspect of the present invention, the above and other objects can be accomplished by the provision of a secondary battery including an electrode assembly, having pluralities of electrode tabs joined to electrode leads, mounted in a receiving part of a battery case, wherein the battery case has concave steps formed at the inner upper end of the receiving part thereof between electrode tab-electrode lead coupling portions (a cathode terminal portion and an anode terminal portion) of the electrode assembly and at the inner opposite sides of the receiving part thereof corresponding to the opposite sides of the electrode assembly such that the electrode assembly is in tight contact with the concave steps.

The internal short circuit of a battery due to the dropping of the battery or the application of external impact to the battery may act as a principal cause of explosion or combustion of the battery. This is because the electrode assembly moves, when the battery drops or the external impact is applied to the battery, with the result that the cathodes and the anodes of the electrode assembly are brought into contact with each other, and therefore, high resistance heat is generated due to conducting current in the contact resistance portions. When the interior temperature of the battery exceeds a critical temperature level due to the resistance heat, the oxide structure of a cathode active material collapses, and therefore, a thermal runaway phenomenon occurs. As a result, the battery may catch fire or explode.

In the secondary battery according to the present invention, on the other hand, the electrode assembly is mounted in the battery case while the electrodes of the electrode assembly are stably located in position by the concave steps formed at predetermined regions of the battery case. Consequently, even when the battery drops or an external force is applied to the battery, the movement of the electrodes is restrained, and therefore, the occurrence of an internal short circuit of the battery is prevented, and, ultimately, the safety of the battery is improved.

Also, the concave steps are formed between the electrode tab-electrode lead coupling portions necessary to accomplish the coupling between the electrode tabs and the electrode leads and at the inside of the receiving part of the battery case corresponding to the opposite sides of the electrode assembly. Consequently, the electrode tab-electrode lead coupling portions are more stably fixed, and the installation of the electrode assembly in the battery case is easily accomplished.

Furthermore, when the concave steps are joined to the battery case by thermal welding, the shape of the concave steps is more stably maintained, and therefore, the operational reliability of the battery is greatly increased.

In order that the inner upper end of the receiving part of the battery case is brought into tight contact with the upper end of the electrode assembly, it is necessary that the a portion of the upper end as well as the side of the receiving part of the battery case be modified when viewing the vertical section of the steps. The steps are depressed in a concave shape when viewing the upper end of the battery. Accordingly, the steps are referred to as "concave steps" in the present invention.

Also, according to circumstances, the step formed at the inner upper end of the receiving part of the battery case between electrode tab-electrode lead coupling portions of the electrode assembly will be referred to hereinafter as an "upper end step," and the steps formed at the inner opposite sides of the receiving part of the battery case corresponding to the opposite sides of the electrode assembly will be referred to hereinafter as "side steps."

The concave steps are formed by considerably modifying the corresponding regions of the receiving part of the battery case. Consequently, it is easier to form the concave steps according to the present invention than minutely form the side of the receiving part according to the conventional art as previously described.

The electrode assembly is not particularly restricted so long as pluralities of electrode tabs are connected with each other to constitute cathodes and anodes. Preferably, the electrode assembly is constructed in a stacking structure and/or a stacking/folding structure. The details of an electrode assembly constructed in such a stacking/folding structure are disclosed in Korean Patent Application Publication No. 2001-0082058, No. 2001-0082059, and No. 2001-0082060, which have been filed in the name of the applicant of the present application. The disclosure of the above-mentioned patent publications is hereby incorporated by reference.

Preferably, the upper end step, formed at the upper end of the battery case between the electrode terminal portions, is formed such that the inner upper end of the battery case can be brought into tight contact with the upper end of the electrode assembly while the contact between the electrode terminal portions is prevented.

In a preferred embodiment, the upper end step has a width less than the distance between the cathode terminal portion and the anode terminal portion. Specifically, the width of the upper end step is preferably 40 to 90%, more preferably 60 to 80%, the distance between the cathode terminal portion and the anode terminal portion. Also, the upper end step has a concave length from the middle upper end of the receiving part of the battery case, corresponding to the space between the two electrode terminal portions, to the upper end of the electrode assembly. In this case, the concave length reaching the upper end of the electrode assembly means a length sufficient to be approximately near to the upper end of the electrode assembly. Preferably, the concave length is at least 50% the distance between the upper end of the battery case and the upper end of the electrode assembly.

In the present invention, the position and size of the steps formed at the opposite sides of the battery case (the side steps) are not particularly restricted so long as the inner opposite sides of the battery case can be brought into tight contact with the opposite sides of the electrode assembly. Specifically, it is possible to stably fix the electrode assembly with the increase in length of the side steps; however, it is difficult to mount the electrode assembly in the battery case when the length of the side steps is excessively increased. Preferably, therefore, the side steps are formed at predetermined positions of the battery case excluding upper and lower end corners while the side steps have a length corresponding to 20 to 80%, preferably 40 to 80%, more preferably 60 to 80%, that of the electrode assembly.

Also, the side steps have a concave length sufficient to be brought into tight contact with the opposite sides of the electrode assembly. The concave length means a length sufficient to be approximately near to the opposite sides of the electrode assembly. Preferably, the concave length is at least 50% the distance between each side of the battery case and the corresponding side of the electrode assembly.

According to circumstances, one side step may be formed at the battery case through which an imaginary horizontal center line of the electrode assembly passes. Alternatively, two side steps may be formed at the battery case through which an imaginary horizontal center line of the electrode assembly passes in a symmetrical structure. More specifically, one side step may be formed at one of the opposite sides of the battery case through which the imaginary horizontal center line of the electrode assembly passes, or two side steps may be formed at the opposite sides of the battery case in a symmetrical structure.

In the present invention, the end of the electrode assembly from which the electrode tabs protrude is referred to as the upper end of the electrode assembly, the two sides of the electrode assembly adjacent to the upper end are referred to as the opposite sides of the electrode assembly, and the end of the electrode assembly opposite to the upper end is referred to as the lower end of the electrode assembly.

According to the present invention, the concave steps may be formed by a post-treatment process after the electrode assembly is mounted in the receiving part of the battery case or the battery case is sealed. Preferably, however, the concave steps are formed by a pre-treatment process, during the manufacture of the battery case, before the electrode assembly is mounted in the receiving part of the battery case.

In the case that the steps are formed by the pre-treatment process, during the manufacture of the battery case, the steps may be formed simultaneously when the receiving part of the battery case is formed by a deep drawing process using a die and punch, having a shape corresponding to that of the desired steps. Alternatively, the receiving part of the battery case may be formed using a conventional die and punch, and then a deep drawing process may be performed using a die and punch corresponding to the shape of the steps.

At this time, the sealing portions at the step regions have an area greater than that of the sealing portions at the non-step regions. Consequently, when the sealing portions at the step regions are also thermally welded simultaneously with the thermal welding of the sealing portions, the concave steps are not deformed, and therefore, the concave steps are more stably maintained, as described below, whereby the operational reliability of the battery is greatly increased.

The post-treatment process may be carried out either manually or automatically through the operation of a machine. When the post-treatment process is used, pressure is preferably applied to the battery case, to such an extent that the electrode assembly, mounted in the battery case, is not deformed, to form the steps. When the steps are formed by the post-treatment process, the steps are not formed at the battery case, during the installation of the electrode assembly in the battery case, whereby it is very easy to mount the electrode assembly in the battery case.

Preferably, the battery case is made of a laminate sheet including a metal layer and a resin layer. Specifically, the battery case may be a pouch-shaped battery case, made of an aluminum laminate sheet, having a receiving part for receiving the electrode assembly. The battery case, made of the laminate sheet, is sealed by thermal welding after the electrode assembly is mounted in the receiving part of the battery case.

More preferably, the thermal welding is also performed to the step regions when the battery case is sealed by the thermal welding. Since the battery case, made of the laminate sheet, has low mechanical strength, the battery case may be easily deformed when an external force is applied to the battery case. As a result, the step regions may be deformed when large pressure is applied to the step regions from the electrode assembly due to various causes. When the step regions of the battery case are thermally welded, on the other hand, such deformation of the step regions is fundamentally prevented, and therefore, the desired safety of the secondary battery is secured.

Preferably, the secondary battery according to the present invention is a lithium secondary battery. Especially, the present invention is preferably applied to a so-called lithium-ion polymer battery in which the electrode assembly is impregnated with a lithium-contained electrolyte in a gel phase.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS

Now, preferred embodiments of the present invention will be described in detail with reference to the accompanying drawings. It should be noted, however, that the scope of the present invention is not limited by the illustrated embodiments.

Figure 4:
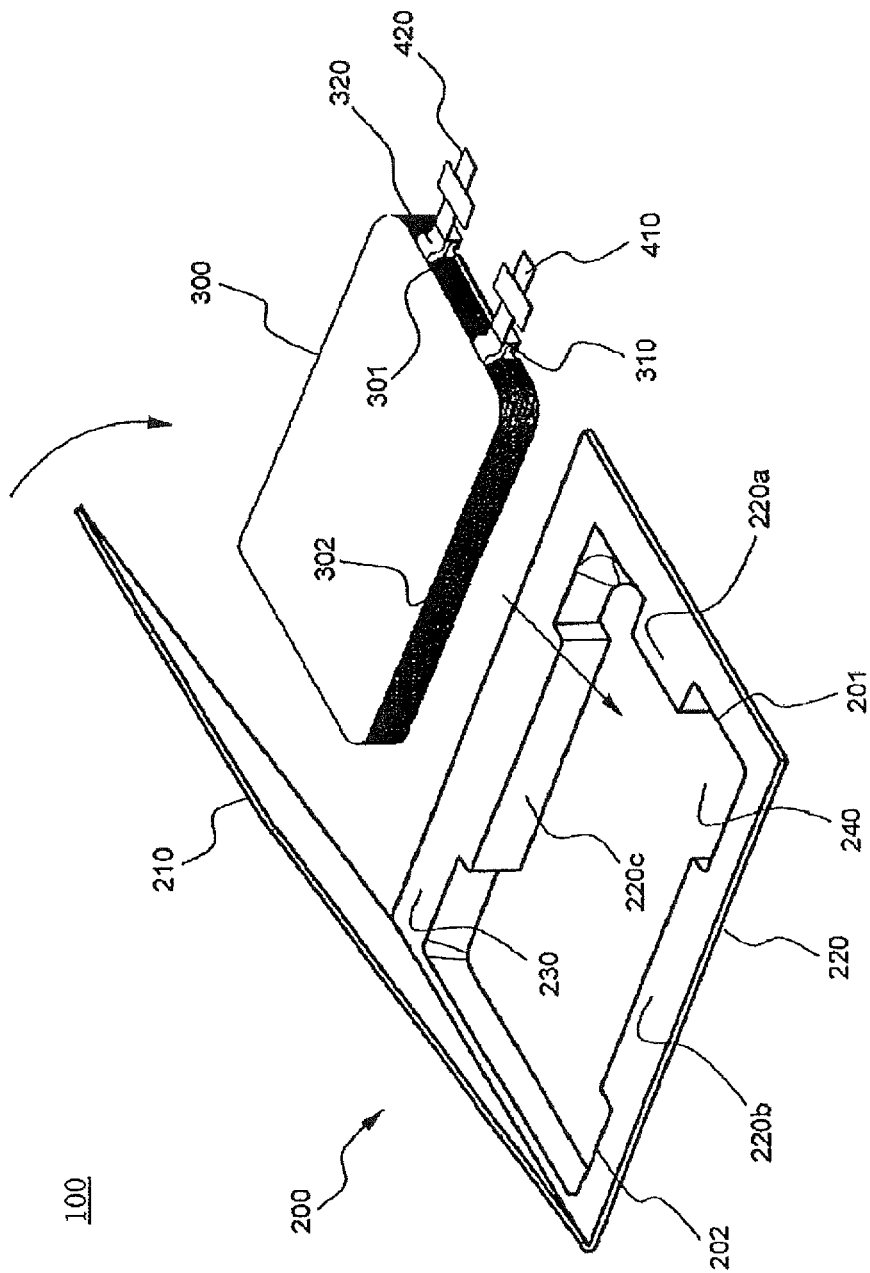
FIG. 4 is an exploded perspective view illustrating a pouch-shaped secondary battery according to a preferred embodiment of the present invention.
Figure 5:
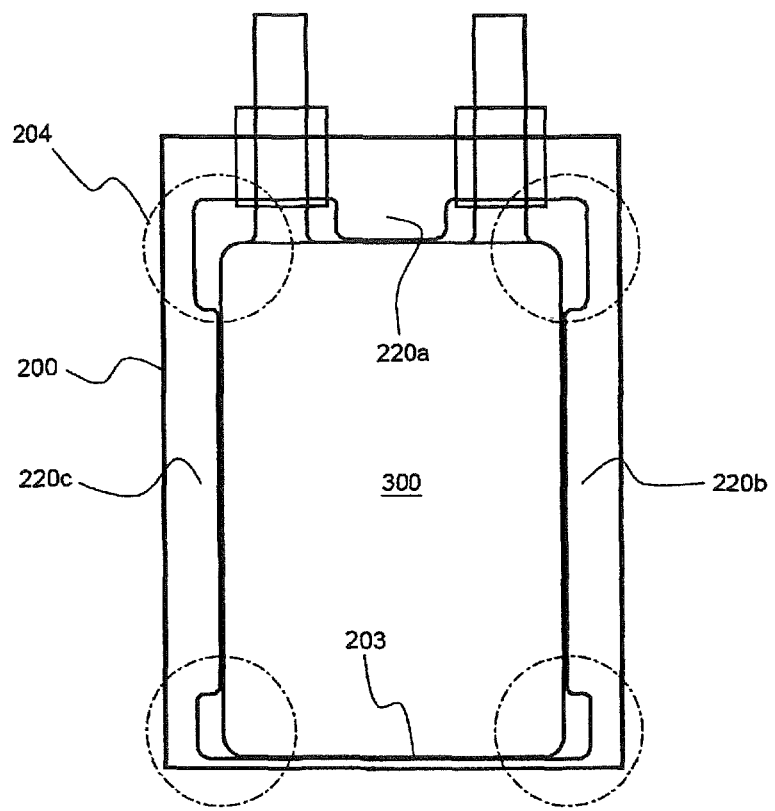
FIG. 5 is a front see-through view illustrating the secondary battery of FIG. 4 in an assembled state.

FIG. 4 is an exploded perspective view typically illustrating a pouch-shaped secondary battery according to a preferred embodiment of the present invention, and FIG. 5 is a front see-through view illustrating the secondary battery of FIG. 4 in an assembled state.

Referring to these drawings, the pouch-shaped secondary battery 100 includes an electrode assembly 300 having cathode tabs 310 and anode tabs 320 welded to a cathode lead 410 and an anode lead 420, respectively, a battery case 200 for receiving the electrode assembly 300, an upper end step 220a formed at the middle of the upper end 201 of the battery case 200, and side steps 220b and 220c formed at the middles of opposite sides 202 of the battery case 200.

The battery case 200 includes a lower case member 220, having a receiving part 240 for receiving the electrode assembly 300, and a cover type upper case member 210 integrally connected to the lower end of the lower case member 220.

Also, a sealing portion 230 is formed along the outer circumferential part of the battery case 200 such that the upper case member 210 and the lower case member 220 are brought into contact with each other, and therefore, the battery case 200 is sealed by thermal welding, during the assembly of the secondary battery 200. The side sealing portion 230 is vertically bent such that the sealing portion 230 is brought into tight contact with the receiving part 240 of the lower case member 220, after the battery case 200 is sealed by the thermal welding, to reduce the overall size of the secondary battery 200.

The upper end step 220a, which is formed at the lower case member 220, has a width less than the distance between the cathode tabs 310 and the anode tabs 320 of the electrode assembly 300 and a height corresponding to the distance from the upper end 201 of the battery case 200 to the upper end 301 of the electrode assembly 300, from which the electrode tabs 310 and 320 protrude. Also, the side steps 220b and 220c, which are formed at the lower case member 220, have a width corresponding to approximately 70% of the length of the electrode assembly 300 and a height corresponding to the distance from each side 202 of the battery case 200 to the corresponding side 302 of the electrode assembly 300. Consequently, when the electrode assembly 300 is mounted in the lower case member 220 of the battery case 200, the upper end 301 of the electrode assembly 300 between the electrode tabs 310 and 320 is brought into tight contact with the upper end step 220a, formed at the inner upper end of the lower case member 220, and the opposite sides 302 of the electrode assembly 300 are brought into tight contact with the corresponding side steps 220b and 220c, formed at the inner opposite sides of the lower case member 220. As a result, the electrode assembly 300 is stably fixed in the lower case member 220 of the battery case 200. Due to the tight contact between the electrode assembly 300 and the lower case member 220 of the battery case 200, the movement of the electrode assembly 300 is restrained, when the secondary battery 100 drops, with the electrode leads 410 and 420 or either side 302 of the electrode assembly 300 down, or an external force is applied to the electrode leads 410 and 420 or either side 302 of the electrode assembly 300, thereby preventing the occurrence of a short circuit in the secondary battery 100.

Furthermore, the electrode assembly 300 is not in tight contact with the lower battery case 220, at corners 204 of the lower battery case 220, at which the upper end 201, the opposite sides 202, and the lower end 203 of the lower battery case 220 intersect each other, due to the upper end step 220a and the side steps 220b and 220c, thereby accomplishing easy installation of the electrode assembly 300 in the lower case member 220 of the battery case 200.

Figure 6:
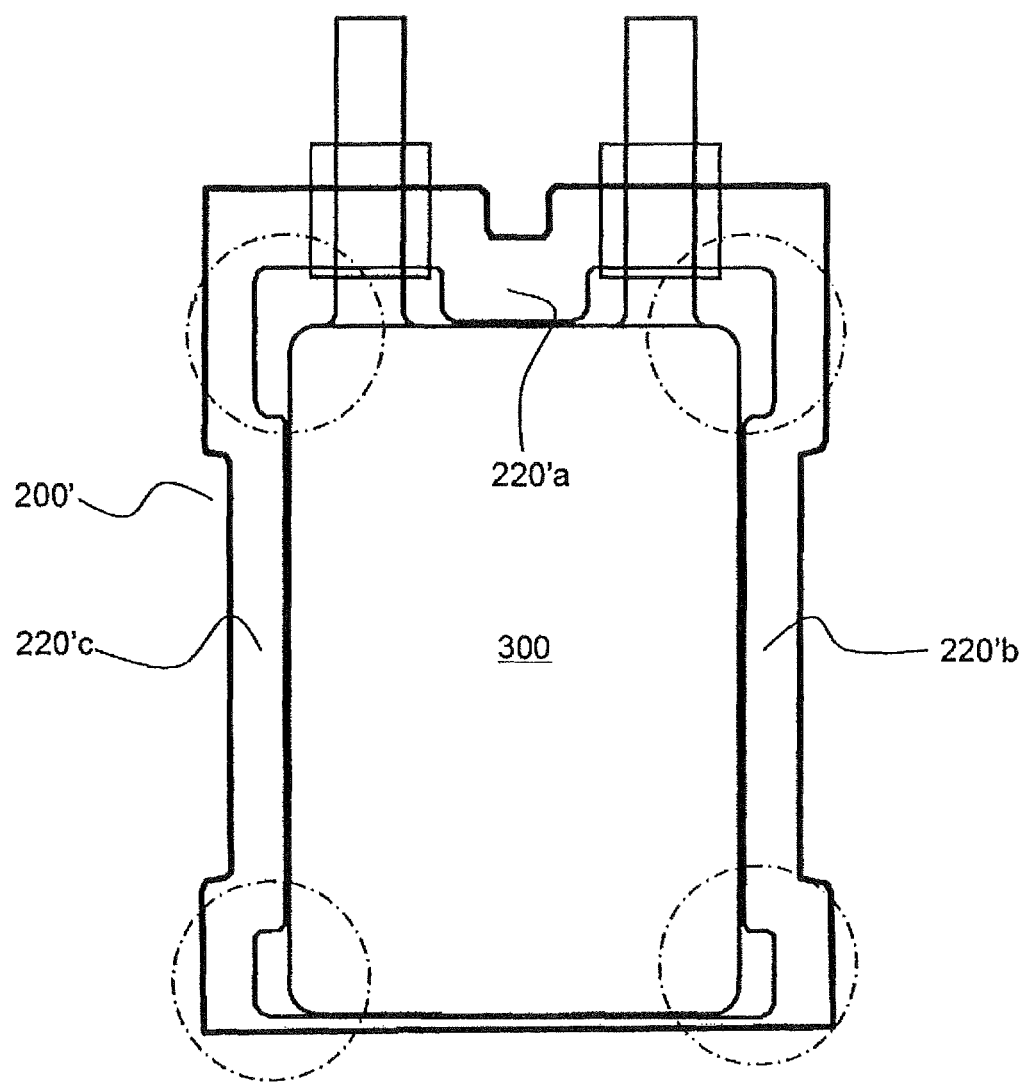
FIG. 6 is a front see-through view illustrating a pouch-shaped secondary battery according to another preferred embodiment of the present invention.

FIG. 6 is a front see-through view typically illustrating a pouch-shaped secondary battery according to another preferred embodiment of the present invention. The secondary battery of FIG. 6 is identical to that of FIG. 5 except for the external appearance of the battery case.

Referring to FIG. 6, an upper end step 220'a and two side steps 220'b and 220'c are formed at the inner upper end and the inner opposite sides of the battery case 200'. The battery case 200' is depressed inward in a concave shape at the outer circumference thereof in correspondence to the shape of the upper end step 220'a and the opposite side steps 220'b and 220'c. These concave steps may be formed, for example, by mounting the electrode assembly 300 in the receiving part of a conventional battery case, thermally welding the outer circumferential sealing portion to seal the battery case, and pressing predetermined regions of the battery case.

Hereinafter, examples of the present invention will be described in more detail. It should be noted, however, that the scope of the present invention is not limited by the illustrated examples.

Example 1

A cathode mixture slurry was prepared by adding 95 weight percent of lithium cobalt oxide as a cathode active material, 2.5 weight percent of a conducting agent, and 2.5 weight percent of a binder to N-methyl-2-pyrrolidone (NMP) as a solvent. An anode mixture slurry was prepared by adding 95 weight percent of artificial graphite as an anode active material, 1.5 weight percent of a conducting agent, and 3.5 weight percent of a binder to NMP as a solvent. The cathode mixture slurry was coated on an aluminum foil, and was then dried and pressed to manufacture cathodes. The anode mixture slurry was coated on a copper foil, and was then dried and pressed to manufacture anodes.

The cathodes and the anodes were stacked while separators were disposed between the cathodes and the anodes to manufacture cathode bicells and anode bicells. Subsequently, the bicells were sequentially stacked, while the bicells were arranged on a long separation film, to manufacture a stacking-folding type electrode assembly. After that, the electrode assembly was mounted in a pouch-shaped battery case, having a concave upper end step formed at the middle of the upper end of the battery case, between the electrode terminals of the electrode assembly, such that the concave upper end step had a length corresponding to 70% of the distance between the cathode lead and the anode lead, and concave side steps formed at the middle of the opposite sides of the battery case such that the concave side steps had a length corresponding to 70% of the total length of the electrode assembly, as shown in FIG. 4, and an electrolyte is injected into the battery case to complete a battery.

Comparative Example 1

Figure 1:
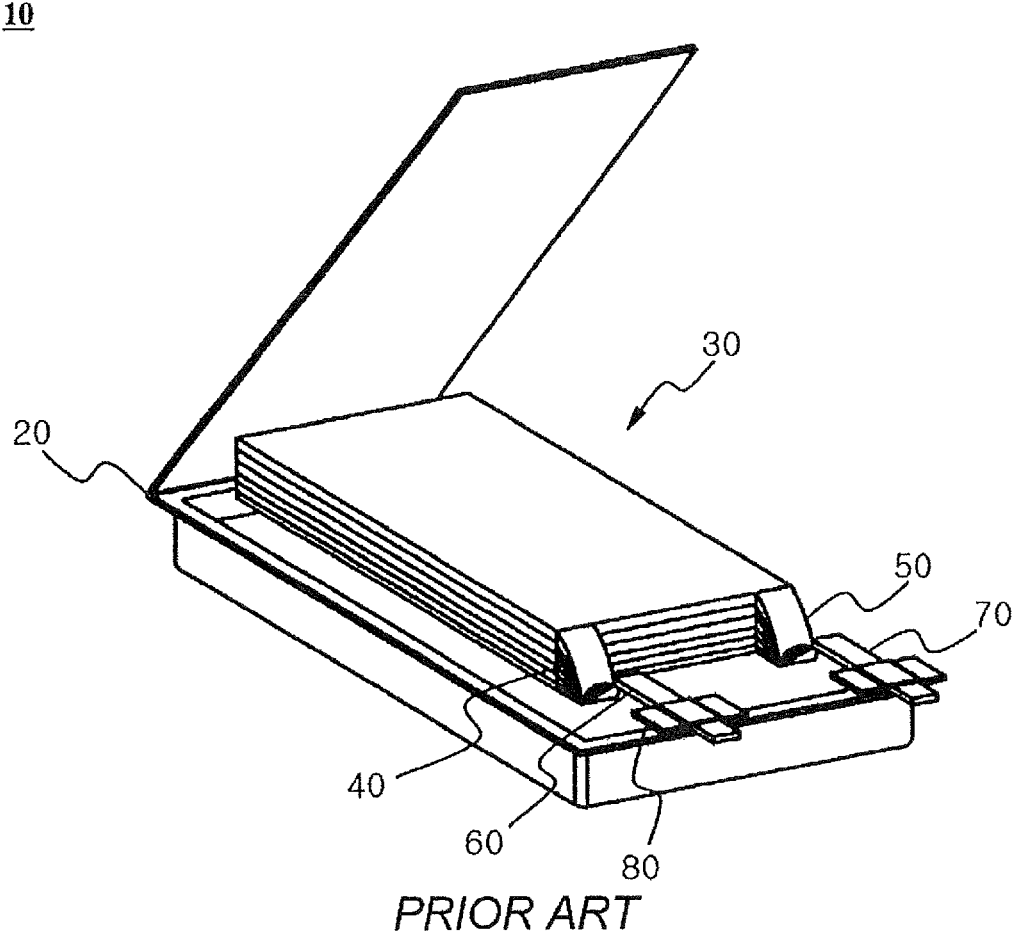
FIG. 1 is an exploded perspective view illustrating the general structure of a conventional pouch-shaped secondary battery.
Figure 2:
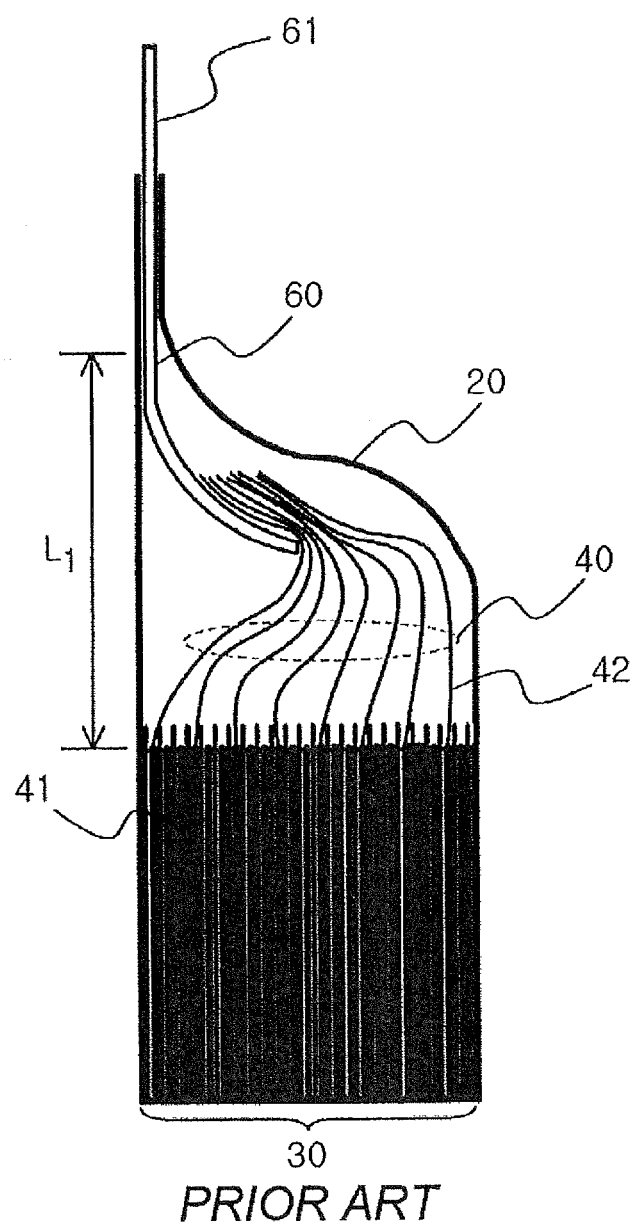
FIG. 2 is an enlarged view, in section, illustrating the inner upper end of a battery case of the secondary battery shown in FIG. 1, in which cathode tabs are coupled to each other in a concentrated state and connected to a cathode lead.
Figure 3:
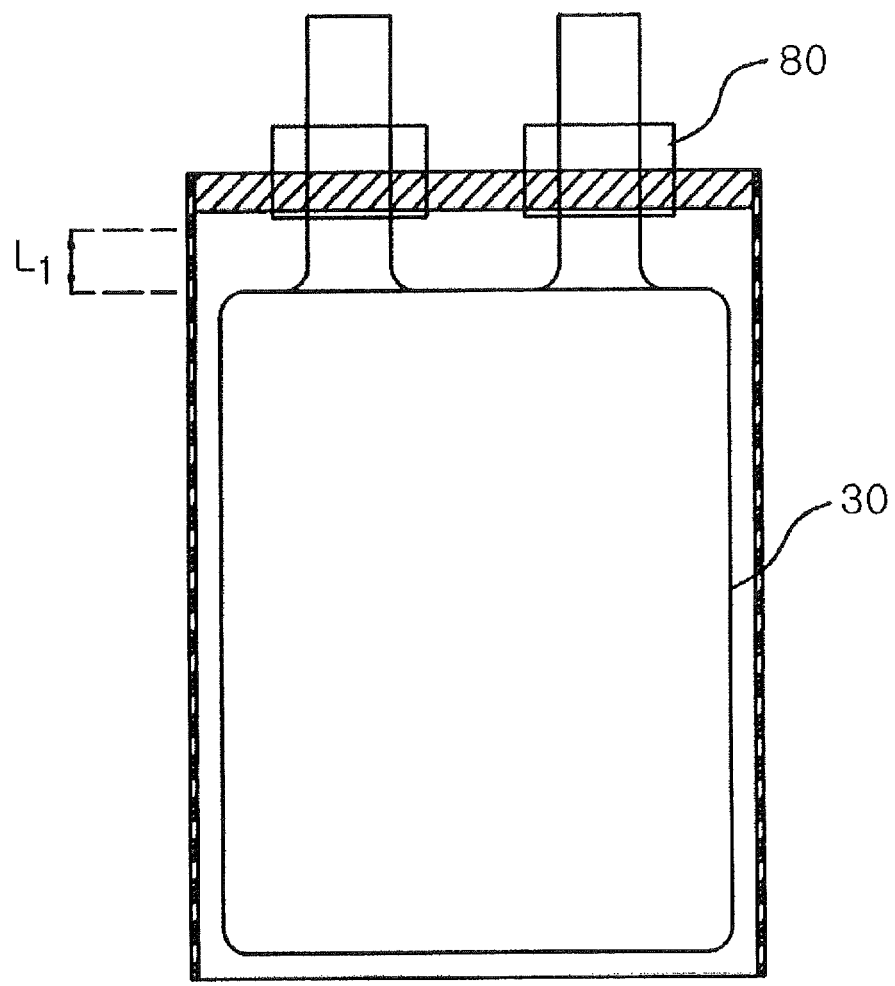
FIG. 3 is a front see-through view illustrating the secondary battery of FIG. 1 in an assembled state.

A battery was manufactured in the same manner as Example 1 except that the electrode assembly is mounted in a pouch-shaped battery case having no steps as shown in FIG. 1.

Experimental Example 1

Dropping experiments were carried out on the batteries manufactured according to Example 1 and Comparative example 1. The experiment results are indicated in Table 1 below. The dropping experiments were repeatedly carried out using 32 batteries for each example. In the dropping experiments, the batteries were freely dropped from a height of 1.5 m such that the upper end of each battery, at which the electrode tab-electrode lead coupling portions are formed, collided with the ground.

TABLE 1

|  | Number of batteries short-circuited after dropping |
|---|---|
| Example 1 | 0 |
| Comparative example 1 | 8 |

As can be seen from Table 1 above, the experiment results revealed that all the batteries manufactured according to Example 1 were not short-circuited after the dropping experiments. Specifically, the electrode assembly was stably fixed by the concave steps formed at each battery case, with the result that the movement of the electrode assembly was restrained, in spite of the impact applied to each battery due to the dropping of the battery, and therefore, the occurrence of a short circuit in the battery was prevented. On the other hand, the experiment results revealed that, for the batteries manufactured according to Comparative example 1, a large number of batteries were short-circuited and caught fire.

Experimental Example 2

Figure 7:
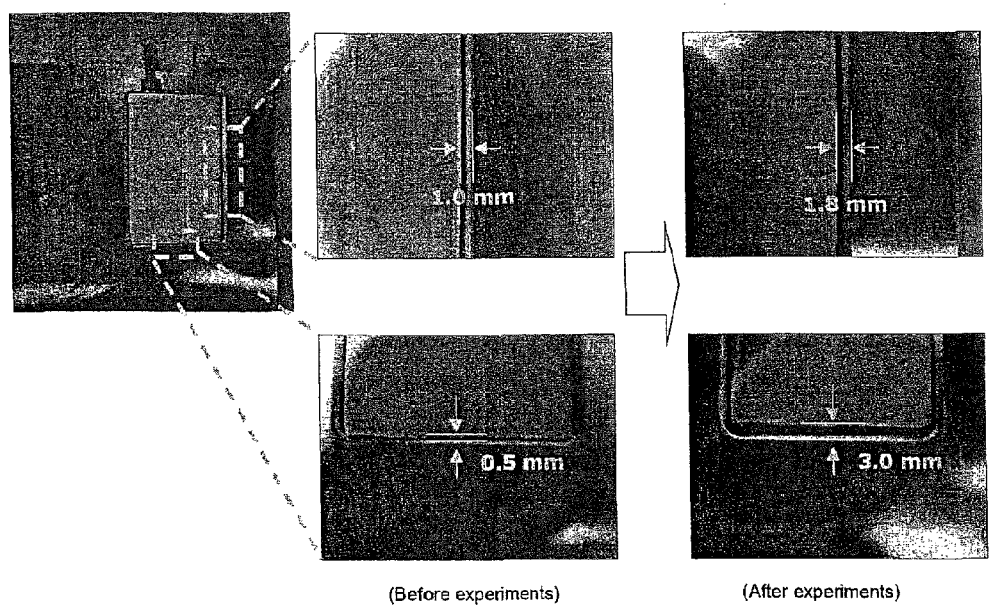
FIG. 7 illustrates an electrode assembly mounted in a battery case manufactured according to Comparative example 1 and the behavior of the electrode assembly in the battery case, especially at specific regions of the battery case, which are enlargedly shown, after an external impact is applied to the battery case, through several photographs.
Figure 8:
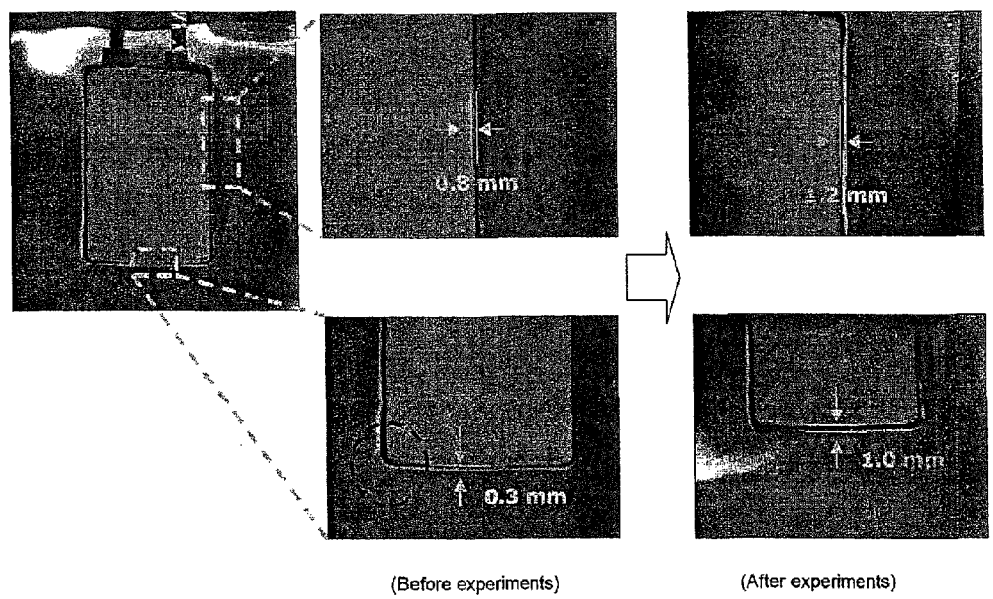
FIG. 8 illustrates an electrode assembly mounted in a battery case, having concave steps, manufactured according to Example 1 and the behavior of the electrode assembly in the battery case, especially at the step regions of the battery case, which are enlargedly shown, after an external impact is applied to the battery case, through several photographs.

Forcible moving experiments were carried out on the electrode assembly mounted in the respective battery cases manufactured according to Example 1 and Comparative example 1. The positional relations between the electrode assemblies and the corresponding battery cases before and after the experiments are illustrated in FIGS. 7 and 8. The distance between the electrode assemblies and the corresponding battery cases, before and after external impacts were applied to the batteries, is approximately indicated in the photographs.

Referring to FIGS. 7 and 8, the experiment results revealed that the side-to-side movement and the vertical movement of the electrode assembly was greatly reduced for the battery manufactured according to Example 1 as compared to the battery manufactured according to Comparative example 1. Specifically, when an impact was applied to the battery manufactured according to Comparative example 1, the distance between the electrode assembly and the battery case at one side of the battery case was increased from 1.0 mm to 1.8 mm, and the distance between the electrode assembly and the battery case at the lower end of the battery case was increased from 0.5 mm to 3.0 mm.

On the other hand, when an impact was applied to the battery manufactured according to Example 1, the distance between the electrode assembly and the battery case at one side of the battery case was increased from 0.8 mm to 1.2 mm, and the distance between the electrode assembly and the battery case at the lower end of the battery case was increased from 0.3 mm to 13.0 mm. That is, the movement distance of the electrode assembly was greatly reduced for the battery manufactured according to Example 1. Especially, the distance between the electrode assembly and the battery case at the lower end of the battery case for the battery manufactured according to Example 1 was only ⅓ the distance between the electrode assembly and the battery case at the lower end of the battery case for the battery manufactured according to Comparative example 1, due to the formation of the upper end step. Consequently, it is easily expected that the movement of the electrode terminals and the contact between the electrode terminals at the V-form regions are effectively prevented. For the battery manufactured according to Example 1, on the other hand, the electrode assembly was not in tight contact with the battery case at the corners of the battery case, and therefore, the installation of the electrode assembly in the battery case was easily accomplished.

INDUSTRIAL APPLICABILITY

As apparent from the above description, the secondary battery according to the present invention is prevented from being short-circuited due to external impact to the secondary battery, such as dropping of the secondary battery. Consequently, the safety of the secondary battery is further improved. Also, the deformation of the receiving part of the battery case and the installation of the electrode assembly in the receiving part of the battery case are easily accomplished.

Consequently, the manufacturing processability of the secondary battery is improved.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A secondary battery including an electrode assembly, having pluralities of electrode tabs joined to electrode leads, mounted in a receiving part of a battery case, wherein the battery case has an upper end step formed at an inner upper end of the receiving part between electrode tab-electrode lead coupling portions and a side step formed at an inner side of the receiving part corresponding to one of two opposite sides of the electrode assembly such that the electrode assembly is in contact with the upper end step and the side step, and wherein the electrode assembly is not in contact with the receiving part at corners of the receiving part at which the inner upper end, the opposite sides, and a lower end of the receiving part intersect each other, wherein a length of the receiving part extends between the inner upper end and the lower end thereof, wherein the upper end step has a length reaching an upper end of the electrode assembly, and wherein the side step has a length extending along the length of the receiving part, the length of the side step corresponding to 60 to 80% of that of the electrode assembly.

2. The secondary battery according to claim 1, wherein the electrode assembly is constructed in a stacking or stacking/folding type structure.

3. The secondary battery according to claim 1, wherein the side step is formed at a location of the battery case through which an imaginary horizontal center line of the electrode assembly passes.

4. The secondary battery according to claim 1, further including a second side step formed at an inner side of the receiving part corresponding to the other of the two opposite sides of the electrode assembly, wherein the side steps are formed at a location of the battery case through which an imaginary horizontal center line of the electrode assembly passes in a symmetrical structure.

5. The secondary battery according to claim 1, wherein the upper end step and the side step are formed by a post-treatment process after the electrode assembly is mounted in the receiving part of the battery case or the battery case is sealed.

6. The secondary battery according to claim 1, wherein the upper end step and the side step are formed simultaneously when the receiving part of the battery case is formed by a drawing process.

7. The secondary battery according to claim 1, wherein the battery case is made of a laminate sheet including a metal layer and a resin layer, the battery case being sealed by thermal welding after the electrode assembly is mounted in the receiving part of the battery case.

8. The secondary battery according to claim 7, wherein the thermal welding is also performed on step regions when the battery case is sealed by the thermal welding.

9. The secondary battery according to claim 7, wherein the sheet is an aluminum laminate sheet.

10. The secondary battery according to claim 1, wherein the battery is a lithium ion polymer battery.

11. The secondary battery according to claim 1, wherein the electrode tab-electrode lead coupling portions include a cathode terminal portion and an anode terminal portion.

12. The secondary battery according to claim 11, wherein the upper end step has a width less than a distance between the cathode terminal portion and the anode terminal portion.

13. The secondary battery according to claim 11, wherein a width of the upper end step is 40 to 90% of a distance between the cathode terminal portion and the anode terminal portion.

14. A secondary battery including an electrode assembly, having pluralities of electrode tabs joined to electrode leads, mounted in a receiving part of a battery case, wherein the battery case has an upper end step formed at an inner upper end of the receiving part between electrode tab-electrode lead coupling portions and a side step formed at an inner side of the receiving part corresponding to one of two opposite sides of the electrode assembly such that the electrode assembly is in contact with the upper end step and the side step, and wherein the upper end step and the side step each extend along a full depth of the receiving part from a floor of the receiving part to an open top end of the receiving part, wherein a length of the receiving part extends between the inner upper end and a lower end thereof, wherein the upper end step has a length reaching an upper end of the electrode assembly, and wherein the side step has a length extending along the length of the receiving part, the length of the side step corresponding to 60 to 80% of that of the electrode assembly.

15. The secondary battery according to claim 14, wherein the battery case is depressed inward in a concave shape at an outer circumference thereof corresponding to a shape of the upper end step and the side step.

16. The secondary battery according to claim 1, wherein the battery case is depressed inward in a concave shape at an outer circumference thereof corresponding to a shape of the upper end step and the side step.

* * * * *